US011138017B2

(12) United States Patent
Dipol et al.

(10) Patent No.: US 11,138,017 B2
(45) Date of Patent: Oct. 5, 2021

(54) SYSTEM AND METHOD FOR PARTITION ADMINISTRATIVE TARGETING IN AN APPLICATION SERVER ENVIRONMENT

(71) Applicant: ORACLE INTERNATIONAL CORPORATION, Redwood Shores, CA (US)

(72) Inventors: Joseph Dipol, Santa Clara, CA (US); Timothy Quinn, Itasca, IL (US); Romain Grecourt, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 27 days.

(21) Appl. No.: 15/706,229

(22) Filed: Sep. 15, 2017

(65) Prior Publication Data
US 2018/0081694 A1 Mar. 22, 2018

Related U.S. Application Data

(60) Provisional application No. 62/395,943, filed on Sep. 16, 2016.

(51) Int. Cl.
G06F 9/4401 (2018.01)
G06F 8/41 (2018.01)
(Continued)

(52) U.S. Cl.
CPC ............. G06F 9/442 (2013.01); G06F 8/441 (2013.01); G06F 9/4405 (2013.01);
(Continued)

(58) Field of Classification Search
None
See application file for complete search history.

(56) References Cited

U.S. PATENT DOCUMENTS 5,848,282 A * 12/1998 Kang ................. G06F 1/206
713/323
7,941,804 B1 5/2011 Herington et al.
(Continued)

FOREIGN PATENT DOCUMENTS

CN 102460393 5/2012
CN 103514245 1/2014
(Continued)

OTHER PUBLICATIONS

European Search Report issued by European Patent Office for European Patent Application No. 15736357.3, dated Feb. 12, 2018, 9 pages.
(Continued)

Primary Examiner — Paul Yen
(74) Attorney, Agent, or Firm — Tucker Ellis LLP

(57) ABSTRACT

A system and method for partition administrative (admin) targeting in an application server, cloud, or other computing environment. An application server can include one or more partitions, wherein each partition provides an administrative and runtime subdivision of a domain. An administrative virtual target associated with a partition enables an administrator to identify an administrative resource group, including one or more administrative applications or resources, for use with the partition. A partition administrative lifecycle state (e.g., SHUTDOWN) can be associated with various substates (e.g., BOOTED or HALTED). When a partition is associated with a first state or substate (e.g., SHUTDOWN.BOOTED), the administrative resource group in that partition continues to run at an associated target, while other resource groups are shut down. When a partition is associated with a second state or substate (e.g., SHUTDOWN.HALTED), all of the resource groups, includ-
(Continued)

ing administrative resource groups, in that partition are shut down.

20 Claims, 6 Drawing Sheets

(51) Int. Cl.
  *G06F 9/445* (2018.01)
  *G06F 9/48* (2006.01)
  *G06F 9/50* (2006.01)

(52) U.S. Cl.
  CPC .......... *G06F 9/44594* (2013.01); *G06F 9/485* (2013.01); *G06F 9/5077* (2013.01); *G06F 2209/463* (2013.01)

(56) References Cited

U.S. PATENT DOCUMENTS

| | | | |
|---|---|---|---|
| 2009/0276771 | A1 | 11/2009 | Nickolov et al. |
| 2011/0213870 | A1 | 9/2011 | Cai et al. |
| 2013/0290960 | A1 | 10/2013 | Astete et al. |
| 2013/0339470 | A1 | 12/2013 | Jeswani et al. |
| 2014/0075019 | A1 | 3/2014 | Mordani et al. |
| 2014/0075032 | A1 | 3/2014 | Vasudevan et al. |
| 2014/0075501 | A1 | 3/2014 | Srinivasan et al. |
| 2014/0075565 | A1 | 3/2014 | Srinivasan et al. |
| 2015/0296030 | A1 | 10/2015 | Maes et al. |
| 2016/0099948 | A1* | 4/2016 | Ott .......................... G06F 9/54 726/1 |

FOREIGN PATENT DOCUMENTS

| | | |
|---|---|---|
| CN | 103516777 | 1/2014 |
| CN | 103703445 | 4/2014 |
| CN | 103718533 | 4/2014 |
| CN | 103733194 | 4/2014 |
| CN | 103858118 | 6/2014 |
| EP | 0614139 A2 | 9/1994 |
| JP | 2004503011 | 1/2004 |
| JP | 2005209029 | 8/2005 |
| JP | 2011232840 | 11/2011 |
| JP | 2014096675 | 5/2014 |
| JP | 2014524608 | 9/2014 |
| WO | 2012063301 | 5/2012 |
| WO | 2014007813 | 1/2014 |
| WO | 2014039866 | 3/2014 |
| WO | 2014039892 | 3/2014 |
| WO | 2014039918 | 3/2014 |

OTHER PUBLICATIONS

Japanese Office Action for Japanese Application No. 2016-574998, dated Feb. 5, 2019, 4 pages.
Chinese Office Action dated Mar. 20, 2019 for Chinese Patent Application No. 201580033903.2, 12 pages.
United States Patent and Trademark Office, Office Action dated Apr. 9, 2019 for U.S. Appl. No. 14/748,094, 14 pages.
Japanese Office Action dated May 14, 2019 for Japanese Patent Application No. 2016-574998, 3 pages.
United States Patent and Trademark Office, Office Action dated Nov. 29, 2017 for U.S. Appl. No. 14/748,094, 15 Pages.
United States Patent and Trademark Office, Office Action dated Sep. 22, 2017 for U.S. Appl. No. 14/864,723, 8 Pages.
European Patent Office, Office Action dated Feb. 12, 2018 for EP Application No. 15736357.3, 9 pages.
Japanese Office Action dated Jun. 4, 2019 for Japanese Patent Application No. 2017-516339, 6 pages.
United States Patent and Trademark Office, Notice of Allowability dated Jul. 10, 2019 for U.S. Appl. No. 14/864,723, 3 pages.
United States Patent and Trademark Office, Office Action dated Sep. 6, 2019 for U.S. Appl. No. 16/415,636, 9 pages.
Chinese Office Action dated Sep. 11, 2019 for Chinese Patent Application No. 201580033903.2, 9 pages.
Japanese Decision for Rejection dated Sep. 17, 2019 for Japanese Patent Application No. 2016-574998, 4 pages.
Sadamori et al., "Linux operates on IBM mainframe zSeries. Overview of mainframe Linux Part 4 Realization of allocating CPU and memory flexibly by LPAR", Monthly Linux Magazine, Askey, Aug. 1, 2004, vol. 6, No. 8, pp. 94-99.
European Patent Office, Communication pursuant to Article 94(3) EPC dated Nov. 13, 2019 for EP Application No. 15781214.0, 8 pages.
Chinese Patent Office, Office Action dated Jan. 20, 2020 for Chinese Patent Application No. 201580051609.4, 7 pages.
Chinese Patent Office, Office Action dated Mar. 16, 2020 for Chinese Patent Application No. 201580033903.2, 10 pages.
United States Patent and Trademark Office, Notice of Allowance dated Mar. 24, 2020 for U.S. Appl. No. 16/415,636, 8 pages.
United States Patent and Trademark Office, Office Action dated Mar. 30, 2020 for U.S. Appl. No. 14/748,094, 15 pages.
Indian Patent Office, First Examination Report dated Jun. 1, 2020 for Indian Patent Application No. 201647040699, 8 pages.
Chinese Patent Office, Office Action dated Jun. 23, 2020 for Chinese Patent Application No. 201580051609.4, 3 pages.
Indian Patent Office, First Examination Report dated Jul. 17, 2020 for Indian Patent Application No. 201747014173, 7 pages.
United States Patent and Trademark Office, Notice of Allowance dated Aug. 20, 2020 for U.S. Appl. No. 16/415,636, 8 pages.
Chinese Patent Office, Decision to Grant dated Sep. 28, 2020 for Chinese Patent Application No. 201580033903.2, 4 pages.
United States Patent and Trademark Office, Office Action dated Oct. 20, 2020 for U.S. Appl. No. 14/748,094, 16 pages.
European Patent Office, Summons to attend oral proceedings pursuant to Rule 115(1) EPC mailed Feb. 11, 2021 for EP Application No. 15781214.0, 10 pages.

* cited by examiner

SYSTEM AND METHOD FOR PARTITION ADMINISTRATIVE TARGETING IN AN APPLICATION SERVER ENVIRONMENT

CLAIM OF PRIORITY

This application claims the benefit of priority to U.S. Provisional patent application titled "SYSTEM AND METHOD FOR PARTITION ADMIN TARGETING IN AN APPLICATION SERVER ENVIRONMENT", Application No. 62/395,943, filed Sep. 16, 2016; which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application server, cloud, or other computing environments, and are particularly related to systems and methods for partition administrative targeting in such environments.

CROSS-REFERENCE TO RELATED APPLICATIONS

This application is related to U.S. patent application titled "SYSTEM AND METHOD FOR SUPPORTING PARTITIONS IN A MULTITENANT APPLICATION SERVER ENVIRONMENT", application Ser. No. 14/748,094, filed Jun. 23, 2015; and U.S. patent application titled "SYSTEM AND METHOD FOR USE OF A GLOBAL RUNTIME IN A MULTITENANT APPLICATION SERVER ENVIRONMENT", application Ser. No. 14/864,723, filed Sep. 24, 2015; each of which above applications are herein incorporated by reference.

BACKGROUND

In an application server, cloud, or other computing environment, that supports the use of partitions, for example, a multitenant application server environment, a software application deployed to the environment may include components or features that are directed to administrative functionality, in addition to the application's business or runtime logic.

When deployed within a cluster, those components or features of an application that are directed to administrative functionality may be installed to an administrative server within the cluster, while the application's business or runtime logic is installed to one or more managed server nodes, where they can operate within the lifecycles of those various nodes.

However, manual allocation of the administrative functionality, business or runtime logic, to various servers, creates a burden on the administrator. Additionally, in an application server environment that uses partitions, when an application is deployed within the context of a partition, the lifecycle of both its administrative functionality and business or runtime logic is generally controlled by the partition's lifecycle, which can lead to undesirable results, for example if the partition is shut down. These are some example of the types of environment in which embodiments of the invention can be used.

SUMMARY

In accordance with an embodiment, described herein are a system and method for partition administrative (admin) targeting in an application server, cloud, or other computing environment. An application server can include one or more partitions, wherein each partition provides an administrative and runtime subdivision of a domain. An administrative virtual target associated with a partition enables an administrator to identify an administrative resource group, including one or more administrative applications or resources, for use with the partition. A partition administrative lifecycle state (e.g., SHUTDOWN) can be associated with various substates (e.g., BOOTED or HALTED). When a partition is associated with a first state or substate (e.g., SHUTDOWN.BOOTED), the administrative resource group in that partition continues to run at an associated target, while other resource groups are shut down. When a partition is associated with a second state or substate (e.g., SHUTDOWN.HALTED), all of the resource groups, including administrative resource groups, in that partition are shut down.

DETAILED DESCRIPTION

As described above, in an application server environment that uses partitions, when an application is deployed within the context of a partition, the lifecycle of both its administrative functionality and business or runtime logic, is generally controlled by the partition's lifecycle, which can lead to undesirable results, for example if the partition is shut down.

In accordance with an embodiment, described herein are a system and method for partition administrative (admin) targeting in an application server, cloud, or other computing environment. An application server can include one or more partitions, wherein each partition provides an administrative and runtime subdivision of a domain. An administrative virtual target associated with a partition enables an administrator to identify an administrative resource group, including one or more administrative applications or resources, for use with the partition.

Application Server Environment

Figure 1:
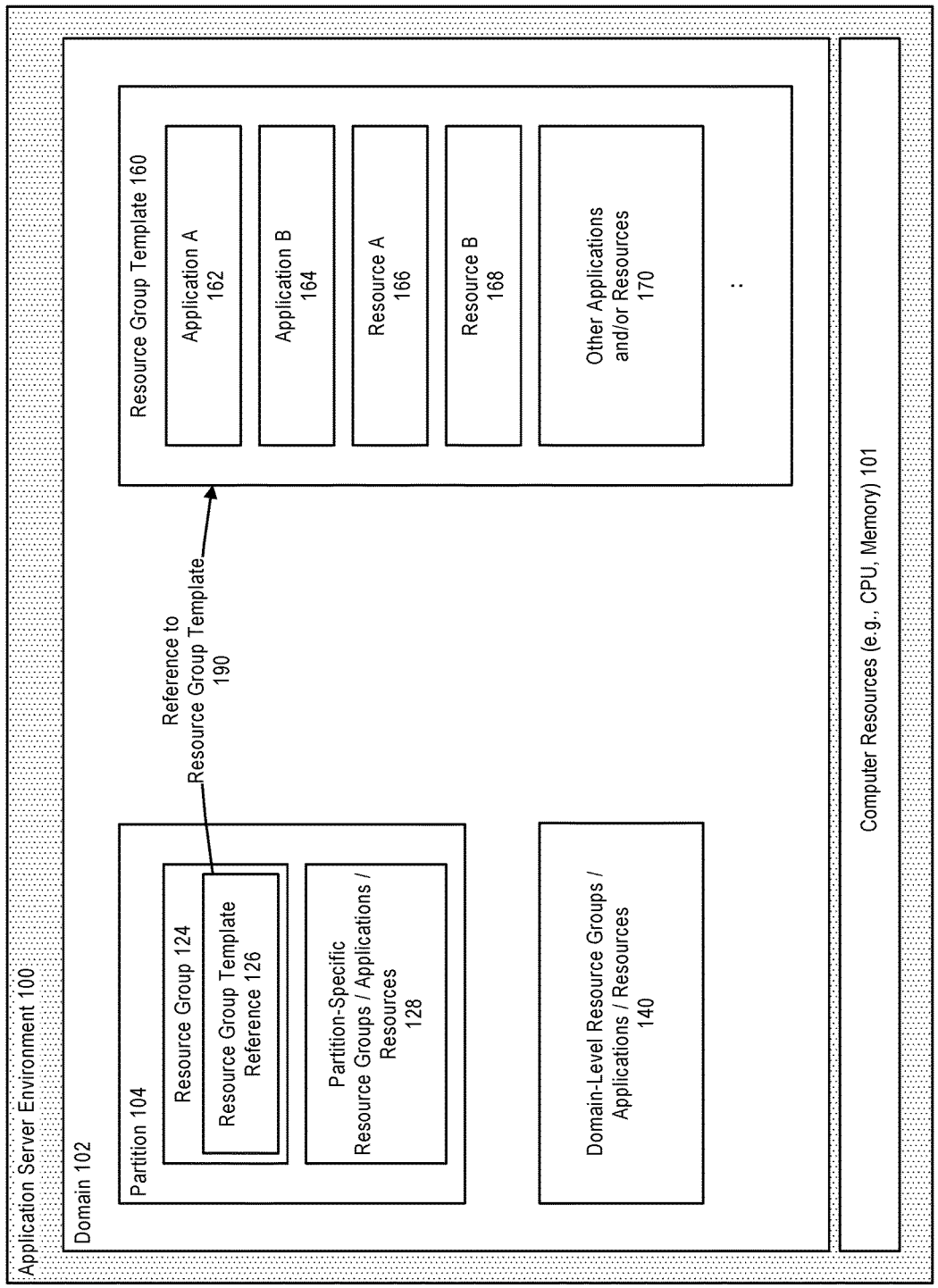
FIG. 1 illustrates a system that includes an application server, cloud, or other environment, in accordance with an embodiment.

FIG. 1 illustrates a system that includes an application server, cloud, or other environment, in accordance with an embodiment.

As illustrated in FIG. 1, in accordance with an embodiment, an application server (e.g., multitenant/multi-tenant, MT, WebLogic/WLS) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
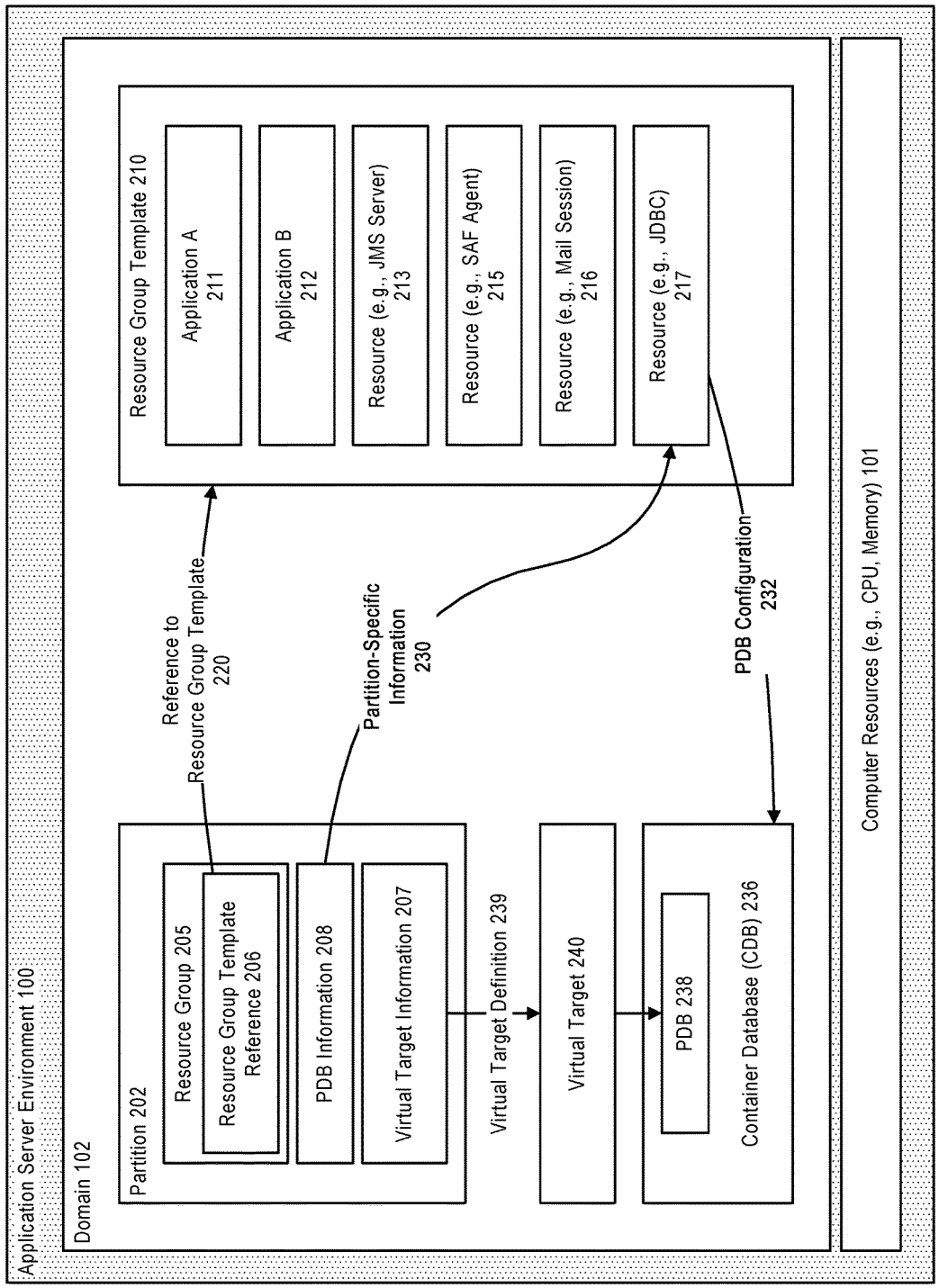
FIG. 2 further illustrates a system that includes an application server, cloud, or other environment, in accordance with an embodiment.

FIG. 2 further illustrates a system that includes an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
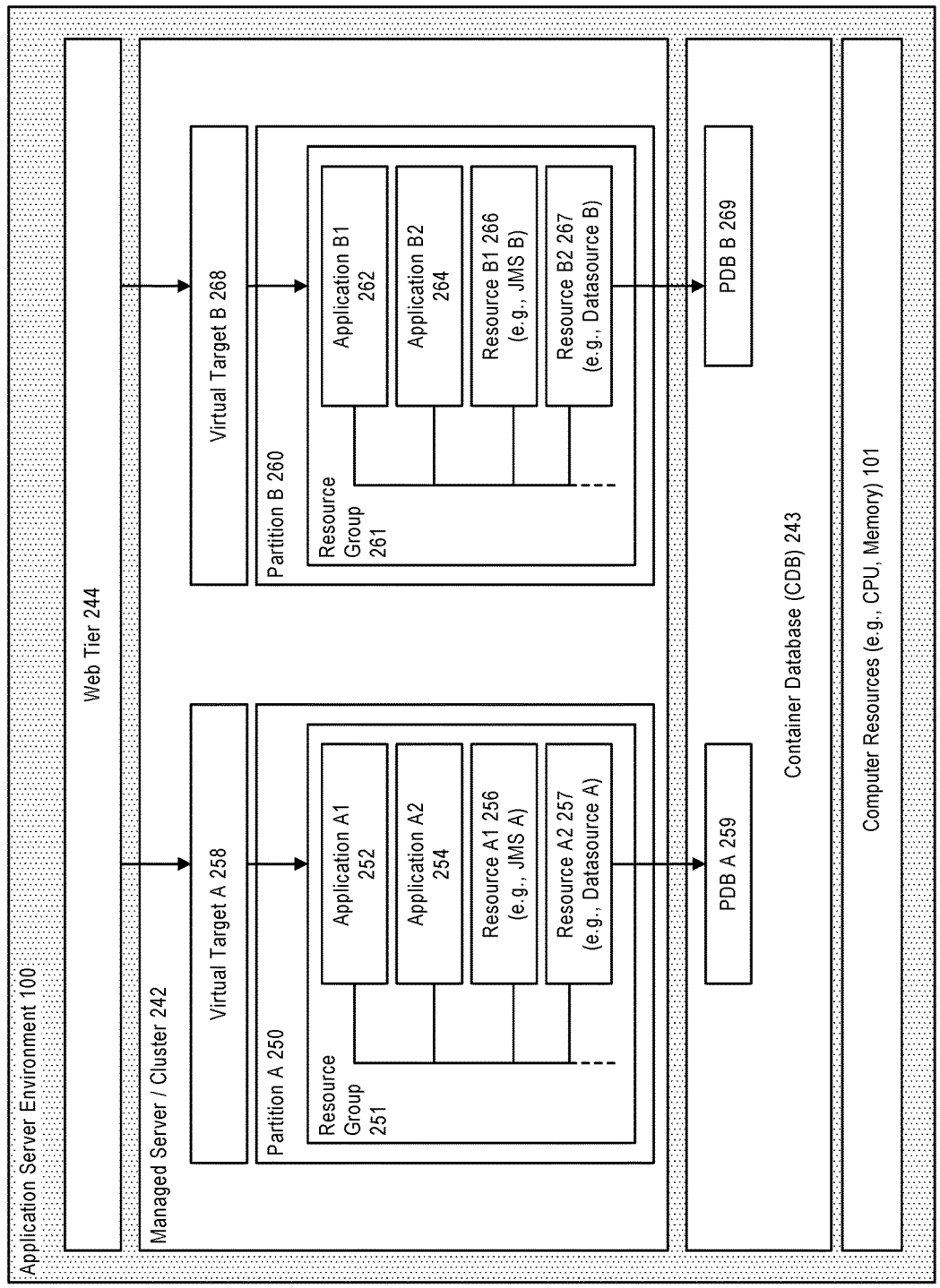
FIG. 3 further illustrates a system that includes an application server, cloud, or other environment, in accordance with an embodiment.

FIG. 3 further illustrates a system that includes an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates. Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications. For example, tenants can represent distinct user organizations, such as different external companies, or different departments within a particular enterprise (e.g., HR and Finance departments), each of which can be associated with a different partition.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

Partition Administrative Targeting (Partition Admin Targeting)

In accordance with an embodiment, the system includes support for partition administrative targeting (partition admin targeting) in an application server, cloud, or other computing environment.

In an application server environment that supports the use of partitions and virtual targets, targeting a resource group to, for example, an administrative server (admin server) can be accomplished by creating a virtual target for the admin server, and targeting the resource group to that virtual target.

However, when the partition is shut down, all of the applications and resources in the partition may be shut down, including components running on the admin server. This can pose difficulties for middleware (e.g., Fusion Middleware) applications and services, and internal applications (e.g., REST interfaces), which include administrative components that generally run on the admin server;

since such applications and services may expect, in the event a partition is shut down, that their administrative components will continue to run.

In accordance with an embodiment, an administrative virtual target (admin virtual target) associated with a partition enables an administrator to identify an administrative resource group (admin resource group), including one or more administrative applications or resources, for use with the partition. A partition administrative lifecycle state (e.g., SHUTDOWN) can be associated with various substates (e.g., BOOTED or HALTED). When a partition is associated with a first state or substate (e.g., SHUTDOWN.BOOTED), the administrative resource group in that partition continues to run at an associated target, while other resource groups are shut down. When a partition is associated with a second state or substate (e.g., SHUTDOWN.HALTED), all of the resource groups, including administrative resource groups, in that partition are shut down.

In accordance with an embodiment, such partition administrative targeting enables support for auto-targeting of a partition's administrative applications or resources to, for example, an admin server; and also provides a partition lifecycle that handles administrative applications or resources appropriately, for example by allowing the administrative applications or resources to continue running even when the remainder of the partition's resource groups are shut down.

Figure 4:
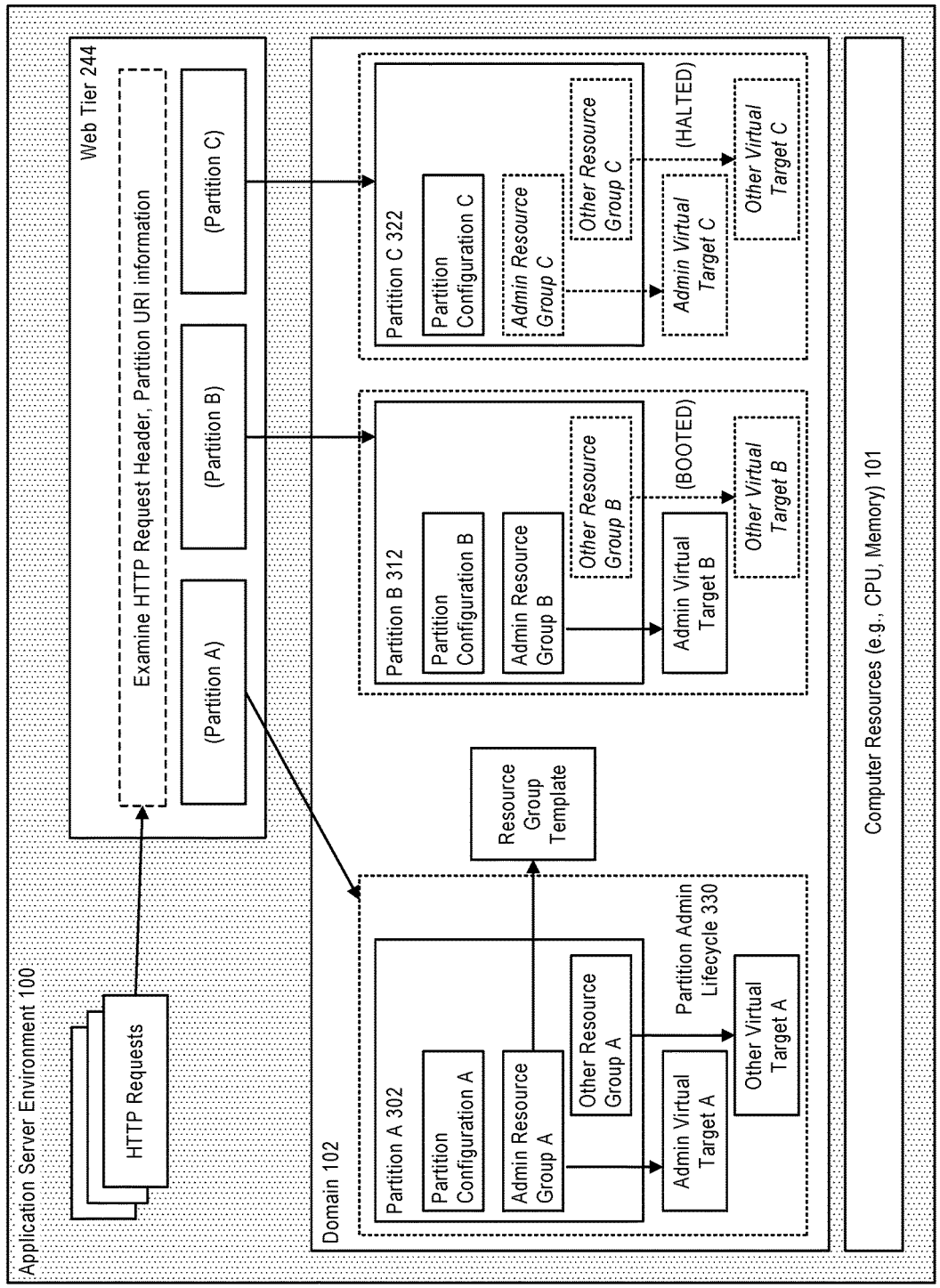
FIG. 4 illustrates partition administrative targeting in an application server, cloud, or other environment, in accordance with an embodiment.

FIG. 4 illustrates partition administrative targeting in an application server, cloud, or other environment, in accordance with an embodiment.

As illustrated in FIG. 4, in accordance with an embodiment, the application server environment can include a plurality of partitions (for example, partition A 302, partition B 312, and partition C 322). Each partition can include one or more of an administrative resource group that is associated with an administrative virtual target, and/or other resource groups that are associated with other virtual targets, the lifecycle of which can be controlled by a partition admin lifecycle (partition admin lifecycle) 330, as described in further detail below.

In the example shown in FIG. 4, partition B is indicated as being associated with a BOOTED substate, wherein the administrative resource group in that partition continues to run at an associated target, while other resource groups are shut down; while partition C is indicated as being associated with a HALTED substate, wherein all of the resource groups, including administrative resource groups, in that partition are shut down.

In accordance with an embodiment, each partition and its associated virtual targets can be registered with a web tier, so that, upon receiving a request (e.g, HTTP request) directed to a particular partition, the web tier can examine the request header or URI information, and dispatch the request to the appropriate partition or targeted server, including, as appropriate, to a partition's administrative virtual target or an associated admin server.

In accordance with an embodiment, each resource group can be associated with an administrative attribute that indicates if that resource group is to be considered an administrative resource group. Generally, an administrative resource group can be targeted in a manner similarly to other resource groups, for example, to an admin server, managed server, or other server. Applications and resources that are contained within an administrative resource group, whether defined directly in the resource group, or indirectly via a resource group template, can be considered administrative applications and resources.

In accordance with an embodiment, each partition can be provided with an automatically-created administrative virtual target, which can be created, for example when the partition is created.

In accordance with an embodiment, an administrative virtual target can be created with various attributes, for example: "Hostnames: empty (wildcard); uriPrefix: /partitions/<partition-name>; Targets: adminserver;" and/or other settings that can be inherited, for example, from an admin server's default HTTP server, and/or retrieved from a partition configuration bean, e.g., partition.getAdminTarget( ).

Partition Administrative Lifecycle

Figure 5:
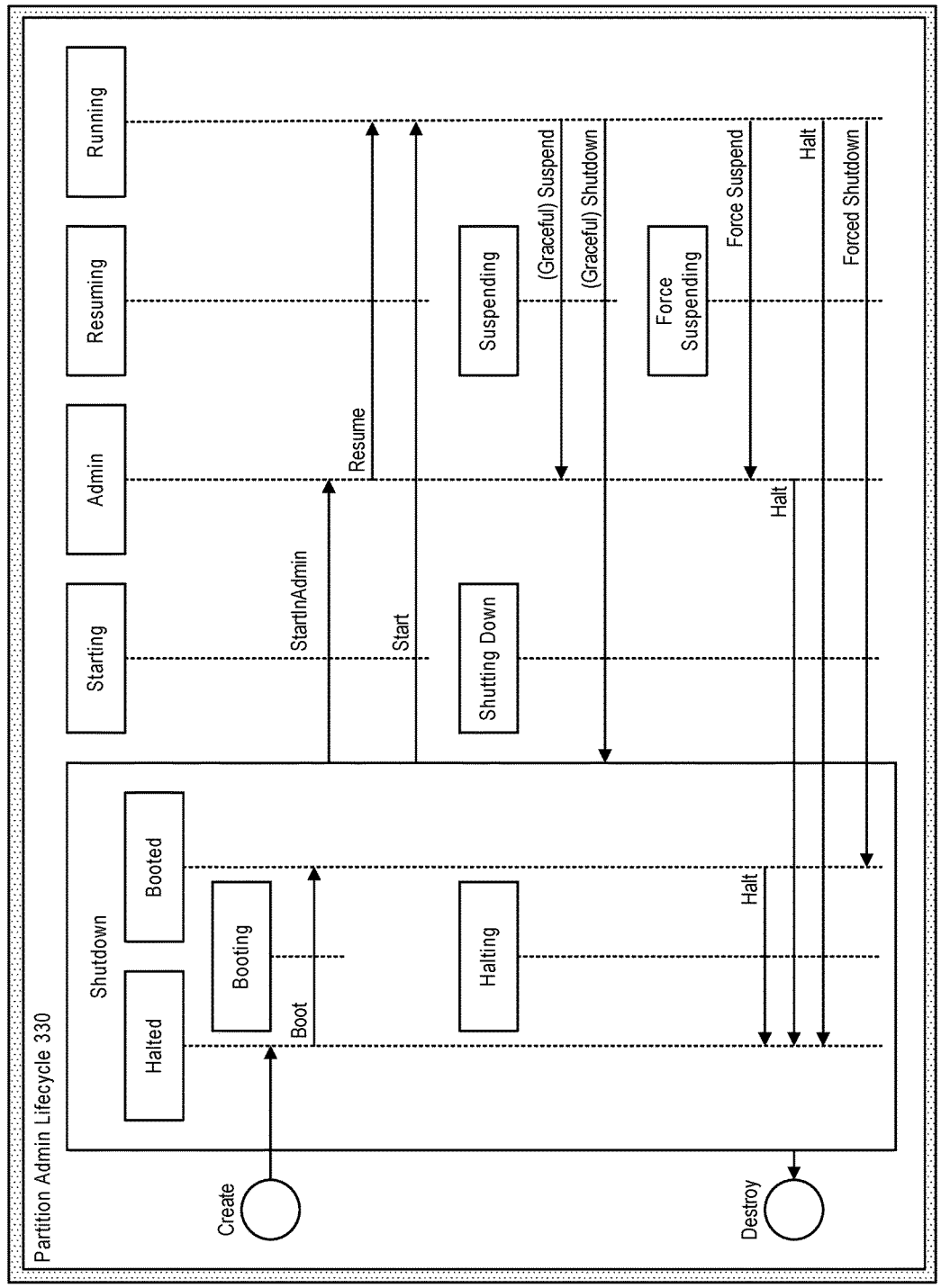
FIG. 5 illustrates a partition administrative lifecycle, for use with an application server, cloud, or other environment, in accordance with an embodiment.

FIG. 5 illustrates a partition administrative lifecycle, for use with an application server, cloud, or other environment, in accordance with an embodiment.

As illustrated in FIG. 5, in accordance with an embodiment, a partition administrative lifecycle state (e.g., SHUTDOWN) can be associated with various substates (e.g., BOOTED or HALTED). When a partition is associated with a first state or substate (e.g., SHUTDOWN.BOOTED), the administrative resource group in that partition continues to run at an associated target, while other resource groups are shut down. When a partition is associated with a second state or substate (e.g., SHUTDOWN.HALTED), all of the resource groups, including administrative resource groups, in that partition are shut down.

In the example described herein, the string "SHUTDOWN.BOOTED" is used as a shorthand notation for, e.g., State=SHUTDOWN, Substate=BOOTED; while the string "SHUTDOWN.HALTED" is used as a shorthand notation for, e.g., State=SHUTDOWN, Substate=HALTED.

In accordance with an embodiment, shutting down a partition places it in a SHUTDOWN.BOOTED substate. When a partition is in a SHUTDOWN.BOOTED substate, its administrative resource groups are running, but all of its other resource groups are shut down. When applications in administrative resource groups are left running, they are actively RUNNING, i.e., they are not in a SUSPENDED state.

In accordance with an embodiment, in an admin server, the partition's internal applications remain running when the partition is in a SHUTDOWN.BOOTED substate. On managed server that are not targets of administrative resource groups the partition is fully shut down (halted) when the partition is shut down.

In accordance with an embodiment, when a partition is in a SHUTDOWN.BOOTED state, administrative internal applications remain running, but other applications are shut down.

In accordance with an embodiment, when a partition is in a SHUTDOWN.HALTED substate, all resource groups in the partition are shut down and the partition is fully shut down on all targets.

In accordance with an embodiment, examples of supported lifecycle operations on a partition can include halt( ): which takes a partition from a SHUTDOWN.BOOTED substate, or any running state, to a SHUTDOWN.HALTED substate; and boot( ): which takes a partition from a SHUTDOWN.HALTED substate to a SHUTDOWN.BOOTED substate.

In accordance with an embodiment, newly created partitions are created in a SHUTDOWN.HALTED substate. An administrator can start a partition from either a SHUTDOWN.BOOTED substate, or a SHUTDOWN.HALTED substate.

The above-described approach enables a partial shutdown of a partition while leaving administrative resource groups running, and/or a full shutdown of a partition leaving no resource groups running; and provides backward compatibility for, e.g., scripts which may be designed operate upon a shutdown state; while also enabling, e.g., internal applications, to be automatically targeted to an admin server, without the administrator having to manually configure such targeting.

Figure 6:
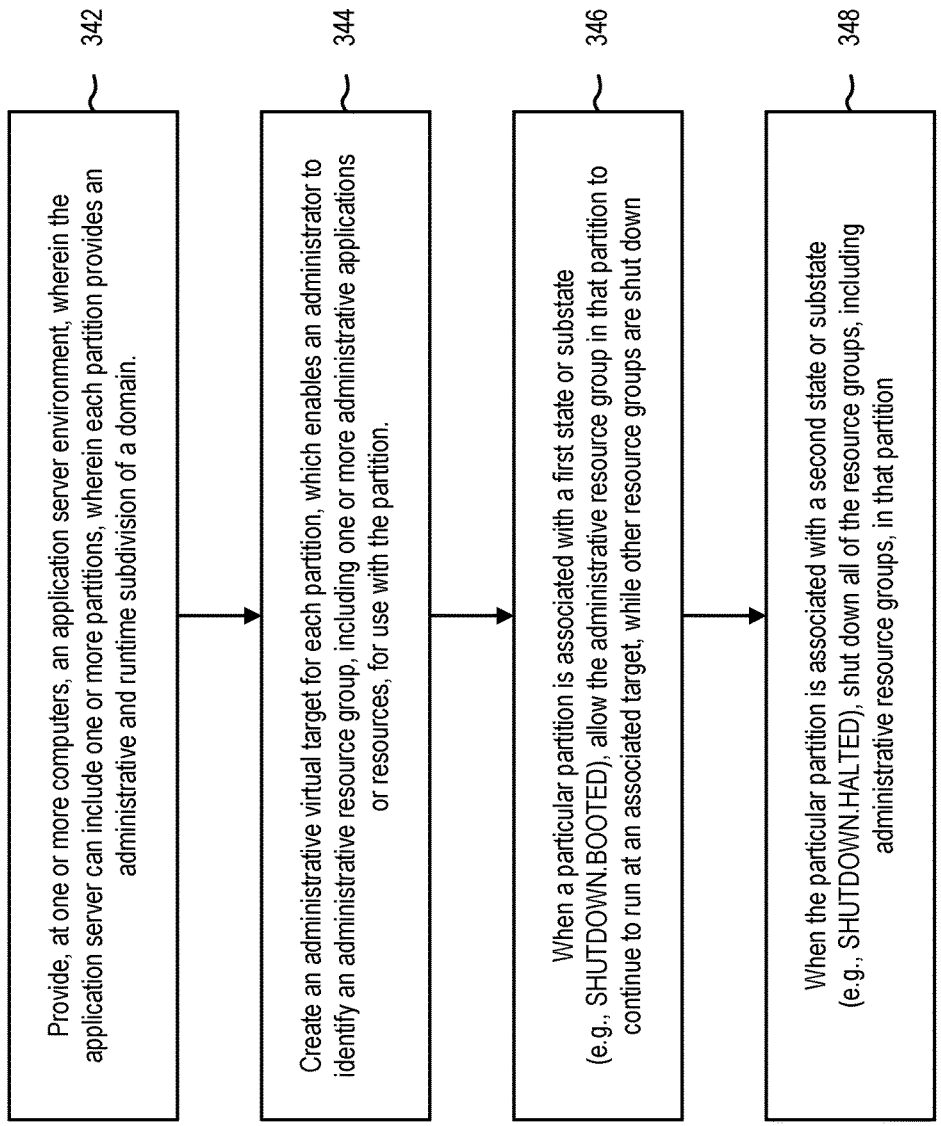
FIG. 6 illustrates a method of providing partition administrative targeting in an application server, cloud, or other environment, in accordance with an embodiment.

FIG. 6 illustrates a method of providing partition administrative targeting in an application server, cloud, or other environment, in accordance with an embodiment.

As illustrated in FIG. 6, in accordance with an embodiment, at step 342, an application server environment is provided at one or more computers, wherein the application server can include one or more partitions, wherein each partition provides an administrative and runtime subdivision of a domain.

At step 344, an administrative virtual target is created for each partition, which enables an administrator to identify an administrative resource group, including one or more administrative applications or resources, for use with the partition.

At step 346, when a particular partition is associated with a first state or substate (e.g., SHUTDOWN.BOOTED), the administrative resource group in that partition is allowed to continue to run at an associated target, while other resource groups are shut down.

At step 348, when the particular partition is associated with a second state or substate (e.g., SHUTDOWN.HALTED), all of the resource groups are shut down, including administrative resource groups, in that partition.

The present invention may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of storage mediums can include, but are not limited to, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. For example, while several embodiments described above illustrate a multitenant application server environment, embodiments can also be used in other types of application server, cloud, or other computing environments. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for partition administrative targeting in an application server, cloud, or other computing environment, comprising:

one or more computers, including a processor and an application server that operates according to a domain configuration that defines, at runtime, a domain for execution of software applications and a plurality of partitions, wherein each partition provides an administrative and runtime subdivision of the domain, wherein each partition contains applications and resources defined by resource groups, wherein the plurality of partitions includes:

a first partition of the domain having a first partition identifier, a first partition configuration, a first partition-level resource group that is accessible via a first virtual target, and a first administrative resource group that is accessible at a first administrative virtual target, and a second partition of the domain having a second partition identifier, a second partition configuration, a second partition-level resource group that is accessible via a second virtual target, and a second administrative resource group that is accessible at a second administrative virtual target, wherein each partition-level resource group is a collection of applications or resources that are defined at partition level;

wherein each of the first administrative resource group and the second administrative resource group that are associated respectively with the first partition and the second partition, and that are accessible respectively at the first administrative virtual target and the second administrative target includes one or more administrative applications or resources usable with its associated partition in operating according to a partition administrative lifecycle;

wherein each of the plurality of partitions and its associated virtual targets are registered with a web tier that operates to receive a request directed to a particular partition of the plurality of partitions including the first and second partitions, examine the request header and dispatch the request including to the particular partition's resource groups; and wherein the system operates according to the partition administrative lifecycle to selectively associate partitions with particular ones of a plurality of lifecycle states including:

a first state wherein each of the partition-level resource group and the administrative resource group at the particular partition are shut down, and a second state wherein the partition-level resource group at the particular partition is shut down, and wherein the administrative resource group at the particular partition continues to run and receive requests at its associated administrative virtual target.

2. The system of claim 1, wherein an administrative virtual target is automatically created for each of the plurality of partitions provided for use with the application server.

3. The system of claim 1, wherein each partition includes a plurality of resource groups in addition to the administrative resource group.

4. The system of claim 1, wherein the system includes a domain-level resource group that includes resources defined at the domain level, and wherein a partition that includes a resource group can reference and utilize the domain-level resource group.

5. The system of claim 3, wherein a partition administrative lifecycle state can be selectively associated with one of:
   a first substate, in which the administrative resource group in the partition continues to run at an associated target, while other resource groups are shut down, or
   a second substate, in which all of the resource groups, including the administrative resource group, and other resource groups in the partition, are shut down.

6. The system of claim 1, wherein the system is provided within a cloud environment.

7. The system of claim 1, wherein a resource group associated with a particular partition can include a reference to a resource group template, which reference causes information associated with the particular partition to act as a binding of deployable resources defined in the resource group template, to specific values for use with that partition.

8. The system of claim 7, wherein the administrative applications and resources include applications and resources contained within an administrative resource group and defined at least one of directly in the administrative resource group, or via the resource group template.

9. A method of providing partition administrative targeting in an application server, cloud, or other environment, comprising:
   providing, at one or more computers, an application server that operates according to a domain configuration that defines, at runtime, a domain for execution of software applications and a plurality of partitions,
   wherein each partition provides an administrative and runtime subdivision of the domain, wherein each partition contains applications and resources defined by resource groups, wherein the plurality of partitions includes:
      a first partition of the domain having a first partition identifier, a first partition configuration, a first partition-level resource group that is accessible via a first virtual target, and a first administrative resource group that is accessible at a first administrative virtual target, and
      a second partition of the domain having a second partition identifier, a second partition configuration, a second partition-level resource group that is accessible via a second virtual target, and a second administrative resource group that is accessible at a second administrative virtual target,
   wherein each partition-level resource group is a collection of applications or resources that are defined at partition level;
   wherein each of the first administrative resource group and the second administrative resource group that are associated respectively with the first partition and the second partition, and that are accessible respectively at the first administrative virtual target and the second administrative target includes one or more administrative applications or resources usable with its associated partition in operating according to a partition administrative lifecycle;
   wherein each of the plurality of partitions and its associated virtual targets are registered with a web tier that operates to receive a request directed to a particular partition of the plurality of partitions including the first and second partitions, examine the request header and dispatch the request including to the particular partition's resource groups; and
   wherein operation of the partition administrative lifecycle selectively associates partitions with particular ones of a plurality of lifecycle states including:
      a first state wherein each of the partition-level resource group and the administrative resource group at the particular partition are shut down, and
      a second state wherein the partition-level resource group at the particular partition is shut down, and wherein the administrative resource group at the particular partition continues to run and receive requests at its associated administrative virtual target.

10. The method of claim 9, wherein an administrative virtual target is automatically created for each of the plurality of partitions provided for use with the application server.

11. The method of claim 9, wherein each partition includes a plurality of resource groups in addition to the administrative resource group.

12. The method of claim 9, further comprising providing a domain-level resource group that includes resources defined at the domain level, and wherein a partition that includes a resource group can reference and utilize the domain-level resource group.

13. The method of claim 11, wherein a partition administrative lifecycle state can be selectively associated with one of:
   a first substate, in which the administrative resource group in the partition continues to run at an associated target, while other resource groups are shut down, or
   a second substate, in which all of the resource groups, including the administrative resource group, and other resource groups in the partition, are shut down.

14. The method of claim 9, wherein the method is performed provided within a cloud environment.

15. A non-transitory computer readable storage medium, including instructions stored thereon which when read and executed by one or more computers cause the one or more computers to perform a method comprising:
   providing, at one or more computers, an application server that operates according to a domain configuration that defines, at runtime, a domain for execution of software applications and a plurality of partitions,
   wherein each partition provides an administrative and runtime subdivision of the domain, wherein each partition contains applications and resources defined by resource groups, wherein the plurality of partitions includes:
      a first partition of the domain having a first partition identifier, a first partition configuration, a first partition-level resource group that is accessible via a first virtual target, and a first administrative resource group that is accessible at a first administrative virtual target, and
      a second partition of the domain having a second partition identifier, a second partition configuration, a second partition-level resource group that is accessible via a second virtual target, and a second administrative resource group that is accessible at a second administrative virtual target, wherein each partition-level resource group is a collection of applications or resources that are defined at partition level;

wherein each of the first administrative resource group and the second administrative resource group that are associated respectively with the first partition and the second partition, and that are accessible respectively at the first administrative virtual target and the second administrative target includes one or more administrative applications or resources usable with its associated partition in operating according to a partition administrative lifecycle;

wherein each of the plurality of partitions and its associated virtual targets are registered with a web tier that operates to receive a request directed to a particular partition of the plurality of partitions including the first and second partitions, examine the request header and dispatch the request including to the particular partition's resource groups; and wherein operation of the partition administrative lifecycle selectively associates partitions with particular ones of a plurality of lifecycle states including:
 a first state wherein each of the partition-level resource group and the administrative resource group at the particular partition are shut down, and
 a second state wherein the partition-level resource group at the particular partition is shut down, and wherein the administrative resource group at the particular partition continues to run and receive requests at its associated administrative virtual target.

16. The non-transitory computer readable storage medium of claim 15, wherein an administrative virtual target is automatically created for each of the plurality of partitions provided for use with the application server.

17. The non-transitory computer readable storage medium of claim 15, wherein each partition includes a plurality of resource groups in addition to the administrative resource group.

18. The non-transitory computer readable storage medium of claim 15, further comprising providing a domain-level resource group that includes resources defined at the domain level, and wherein a partition that includes a resource group can reference and utilize the domain-level resource group.

19. The non-transitory computer readable storage medium of claim 17, wherein a partition administrative lifecycle state can be selectively associated with one of:
 a first substate, in which the administrative resource group in the partition continues to run at an associated target, while other resource groups are shut down, or
 a second substate, in which all of the resource groups, including the administrative resource group, and other resource groups in the partition, are shut down.

20. The non-transitory computer readable storage medium of claim 15, wherein the method is performed provided within a cloud environment.

* * * * *